(12) United States Patent
Weh et al.

(10) Patent No.: US 12,459,480 B2
(45) Date of Patent: Nov. 4, 2025

(54) HYDRAULIC BLOCK FOR A HYDRAULIC UNIT OF A HYDRAULIC POWER BRAKE SYSTEM

(71) Applicant: Robert Bosch GmbH, Stuttgart (DE)

(72) Inventors: Andreas Weh, Sulzberg (DE);
Matthias Mayr, Rettenberg (DE);
Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 449 days.

(21) Appl. No.: 18/053,808

(22) Filed: Nov. 9, 2022

(65) Prior Publication Data

US 2023/0256953 A1    Aug. 17, 2023

(30) Foreign Application Priority Data

Feb. 16, 2022    (DE) .................... 10 2022 201 575.4

(51) Int. Cl.
*B60T 17/04* (2006.01)
*B60T 8/36* (2006.01)
*B60T 17/02* (2006.01)
*F15B 15/02* (2006.01)

(52) U.S. Cl.
CPC ............. *B60T 17/04* (2013.01); *B60T 8/368* (2013.01); *B60T 17/02* (2013.01); *F15B 15/02* (2013.01)

(58) Field of Classification Search
CPC ........ B60T 8/363; B60T 8/368; B60T 8/3685; B60T 8/4081; B60T 17/02; B60T 17/04
USPC ..................................................... 303/DIG. 10
See application file for complete search history.

(56) References Cited

U.S. PATENT DOCUMENTS

| | | | | |
|---|---|---|---|---|
| 8,714,662 | B2* | 5/2014 | Isono | B60T 13/165 |
| | | | | 303/114.1 |
| 9,321,444 | B2* | 4/2016 | Ganzel | B60T 7/042 |
| 9,533,665 | B2* | 1/2017 | Nimura | B60T 7/042 |
| 10,407,040 | B2* | 9/2019 | Jeon | B60T 7/042 |
| 2015/0298675 | A1* | 10/2015 | Mayr | B60T 8/368 |
| | | | | 92/169.1 |
| 2021/0188232 | A1* | 6/2021 | Mayr | B60T 8/4081 |
| 2021/0309197 | A1* | 10/2021 | Weh | B60T 8/368 |
| 2023/0256953 | A1* | 8/2023 | Weh | F15B 15/02 |
| | | | | 137/597 |
| 2023/0256954 | A1* | 8/2023 | Weh | B60T 17/04 |
| | | | | 137/597 |

FOREIGN PATENT DOCUMENTS

DE    102014212917 A1 *    1/2016    ............ B60T 13/146
DE    102016202113 A1    8/2017

* cited by examiner

*Primary Examiner* — Thomas J Williams
(74) *Attorney, Agent, or Firm* — NORTON ROSE FULBRIGHT US LLP

(57) ABSTRACT

A drilling of a hydraulic block of a hydraulic unit of a pressure-regulating module of a power brake system and, in particular, a set-up of receptacles for solenoid valves in a valve side of the hydraulic block.

14 Claims, 7 Drawing Sheets

HYDRAULIC BLOCK FOR A HYDRAULIC UNIT OF A HYDRAULIC POWER BRAKE SYSTEM

CROSS REFERENCE

The present application claims the benefit under 35 U.S.C. § 119 of German Patent Application No. DE 10 2022 201 575.4 filed on Feb. 16, 2022, which is expressly incorporated herein by reference in its entirety.

FIELD

The present invention relates to a right-parallelpiped-shaped hydraulic block for a hydraulic unit of a hydraulic power brake system.

BACKGROUND INFORMATION

German Patent Application No. DE 10 2016 202 113 A1 describes a narrow, right-parallelpiped-shaped hydraulic block for a hydraulic unit of a slip-controlled hydraulic power brake system, in which a master brake cylinder bore is introduced from one narrow side, straight through to an opposite narrow side, and a power brake cylinder bore is introduced perpendicularly to the master brake cylinder bore, likewise straight through two large, opposite sides of the hydraulic block. In addition, the conventional hydraulic block has a blind-end bore as a receptacle for a pedal-travel simulator. In order to generate a brake pressure by external force, a power brake piston is displaceable in the power brake cylinder bore by an electric motor, via a ball screw. The electric motor is positioned outside on one of the two large sides of the hydraulic block, coaxially to the power brake cylinder bore, and the ball screw is situated between the electric motor and the power brake piston, likewise coaxially to the electric motor and the power brake cylinder bore. The electric motor and the ball screw form a power brake drive unit and form, together with the power brake piston and the power brake cylinder bore, an externally-powered brake pressure generator for the hydraulic vehicle brake system. In a large side opposite to the electric motor, the conventional hydraulic block includes receptacles for solenoid valves for regulating brake pressure.

SUMMARY

A hydraulic block of the present invention is for a hydraulic unit of a hydraulic power brake system.

In order to generate a hydraulic brake pressure, using external force, the hydraulic block of an example embodiment of the present invention includes a power brake cylinder bore, which passes through the hydraulic block from one side to an opposite side. These two opposite sides of the hydraulic block are referred to here as the motor side and the valve side. The motor side of the hydraulic block is intended for attaching an electric motor to displace a power brake piston in the power brake cylinder bore via, e.g., a lead screw in the form of a rotation-to-translation conversion gear, with the optional interposition of reduction gearing. By moving the power brake piston in the power brake cylinder bore, brake fluid is displaced from the power brake cylinder bore, and the brake pressure is generated, using external force.

The motor side and the valve side are preferably mutually opposed, large sides of the hydraulic block. The other four sides of the right-parallelpiped-shaped hydraulic block all border on the motor side and the valve side and are referred to here as the upper side, lower side, attachment side, and the side opposite to the attachment side.

A master brake cylinder bore opens out on the attachment side of the hydraulic block, and the attachment side of the hydraulic block is fastened to a bulkhead of a motor vehicle in such a manner, that the upper side of the hydraulic block is at the top.

The hydraulic block of an example embodiment of the present invention has, in the valve side, receptacles for solenoid valves and further hydraulic components, such as check valves, hydraulic reservoirs, damping chambers, and pressure sensors for regulating brake pressure. Brake pressure regulation means regulation of a brake pressure in the vehicle brake system, in brake circuits of the vehicle brake system, and/or in hydraulic wheel brakes of the vehicle brake system connected to the hydraulic block; regulation also being understood as control. The brake pressure regulation may also include, in particular, a traction control system. Traction control systems include, for example, antilock, drive slip and/or electronic stability programs, for which the abbreviations ABS, TCS and/or ESP are customary. Traction control systems are conventional and are not explained here.

The hydraulic block is used for mechanical attachment and hydraulic interconnection of the hydraulic components of the vehicle brake system, for generating brake pressure, and/or for regulating brake pressure and/or for controlling slip. The hydraulic components are secured in the receptacles in the hydraulic block, which are mostly formed as cylindrical depressions, blind-end bores, or through-holes, some of which have stepped diameters. The hydraulic block may also include such receptacles in sides other than the valve side. "Interconnected" means that the receptacles and/or the hydraulic components secured in them are connected by brake fluid lines in the hydraulic block in accordance with a hydraulic circuit diagram of the vehicle brake system. Typically, however, the brake fluid lines are not necessarily drilled in the hydraulic block.

In particular, the hydraulic block is drilled cardanically, which means that the bores and lines, that is, in particular, the master brake cylinder bore, the power brake cylinder bore, a simulator cylinder bore, the receptacles for the hydraulic components, and the brake fluid lines connecting them, are introduced in the hydraulic block parallelly and perpendicularly to each other and to the sides and edges of the right-parallelpiped-shaped hydraulic block. The present invention does not exclude individual, oblique bores. In this case, through-holes or blind-end bores in the hydraulic block referred to as "lines" or "bores" and/or as "cylinder bores" may also be produced in a manner other than drilling.

Fitted with the hydraulic components of the vehicle brake system and/or its traction control system, the hydraulic block constitutes the hydraulic unit; "fitted" meaning that the hydraulic components are secured in the specific receptacles of the hydraulic block provided for them.

In addition, the hydraulic block includes, in particular, connections for brake lines, which lead to hydraulic wheel brakes of the vehicle brake system.

The present invention is directed to the set-up of the receptacles of particular solenoid valves of the brake pressure regulation and traction control system of the hydraulic power brake system, in the valve side of the hydraulic block, and the brake fluid lines in the hydraulic block that connect them.

According to an example embodiment of the present invention, the master brake cylinder bore opens out on the attachment side of the hydraulic block, via which the hydraulic block is attached to the bulkhead of the motor vehicle. The power brake cylinder bore is introduced perpendicularly to the master brake cylinder bore, in the hydraulic block of the present invention, and opens out on the motor side. In the valve side opposite to the motor side, the hydraulic block has, inter alia, a receptacle for a discharge valve and a receptacle for a power brake valve. The discharge valve connects the master brake cylinder bore to the power brake cylinder bore; and hydraulic wheel brakes of the power brake system are connected to the power brake cylinder bore via the power brake valve, preferably via an intake valve for each wheel brake. The receptacles for the discharge valve and for the power brake valve are situated, in particular, in the valve side, between the power brake cylinder bore and the attachment side. A brake fluid line runs from a base of the receptacle for the discharge valve, in particular, axially parallelly and, preferably, coaxially to the receptacle, into a groove encircling the master brake cylinder bore, via which the discharge valve communicates around a master brake cylinder piston, with a connection for the brake fluid reservoir in an upper side of the hydraulic block. An oblique bore runs from the receptacle for the discharge valve to the receptacle for the power brake valve, through which the discharge valve communicates with the power brake cylinder bore, as well. "Oblique bore" means that the bore runs neither perpendicularly, nor parallelly to the other bores, to the edges, and to the sides of the hydraulic block, but transversely to other bores and to the edges and sides of the hydraulic block.

Further refinements and advantageous embodiments of the present invention are disclosed herein.

In one example embodiment of the present invention, a brake fluid line runs from the connection for the brake fluid reservoir in the upper side of the hydraulic block, parallelly to the master brake cylinder bore, in the direction of the attachment side; and after a bend downwards in the direction of the lower side, it runs to a receptacle for a separating valve and/or to a receptacle for a power brake valve. In particular, the segment of the brake line leading downwards in the direction of the lower side of the hydraulic block runs between the attachment side of the hydraulic block and the power brake cylinder bore, close to and past the power brake cylinder bore. In this context, a receptacle for a check valve, from which the brake fluid line starts, may be provided at a base of the connection for the brake fluid reservoir in the upper side of the hydraulic block. Using the separating valve, hydraulic pumps of a traction control system of the power brake system may draw brake fluid off from the brake fluid reservoir.

In the case of a modular construction of the power brake system, where a pressure-regulating module is separate from a pressure-generating module including the hydraulic block, one embodiment of the present invention provides connections for the pressure-regulating module near the attachment side, in the motor side of the hydraulic block according to the notice of invention. "Near" means at a distance of not more than 1 to 1.5 times the diameter of the connection. Brake lines running to the pressure-regulating module may be joined to the connections, for example, using press-in nipples or screw ferrules.

The hydraulic block of the present invention includes two receptacles for second separating valves in the valve side. The second separating valves are assigned to the power brake cylinder bore. They separate the power brake cylinder bore hydraulically from the brake circuits of the vehicle brake system, when they are closed, and connect the power brake cylinder bore to the brake circuits, when they are open.

In specific example embodiments of the present invention, all of the features disclosed in the description and the figures may be implemented individually by themselves or, in principle, in any desired combination. Variants of the present invention, which do not include all of the features of a specific embodiment, but only one or more of them, are possible. Variants of the hydraulic block of the present invention are also possible, in which the receptacles for the discharge valve and/or for the power brake valve are joined to connections, receptacles, and/or bores at a place and/or in a manner other than indicated herein.

BRIEF DESCRIPTION OF THE DRAWINGS

In the following, the present invention is described in greater detail in light of a specific embodiments shown in the figures.

DETAILED DESCRIPTION OF EXAMPLE EMBODIMENTS

FIGS. 2 through 7 are simplified and schematic representations for understanding and for illustrating the present invention. The hydraulic block is drawn transparently, in order to show its drilling. For the sake of clarity and recognition, only a portion of the drilling of the hydraulic block is shown in each of FIGS. 4 through 7.

Figure 1:
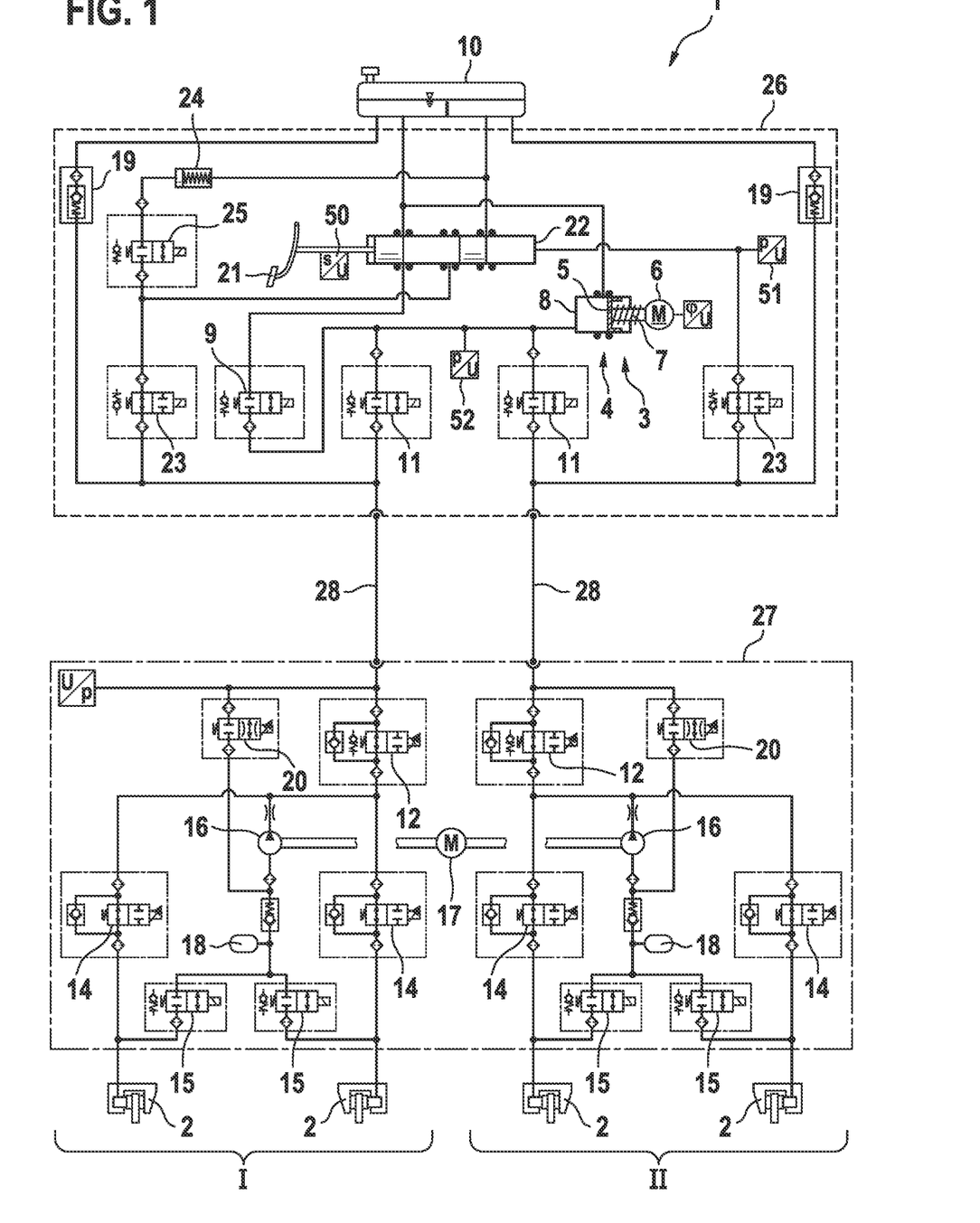
FIG. 1 shows a hydraulic circuit diagram of a power brake system, according to an example embodiment of the present invention.

The vehicle brake system 1 represented in FIG. 1 is provided for a passenger car having four hydraulic wheel brakes 2 and is constructed as a dual-circuit brake system having two hydraulic wheel brakes 2 in each brake circuit I, II. Other variants are possible, for example, a single-circuit brake system or a multicircuit brake system having more than two brake circuits I, II and/or a different number of wheel brakes 2 and/or a different assignment of wheel brakes 2 to brake circuits I, II.

Vehicle brake system 1 includes an externally-powered electrohydraulic brake pressure generator 3 having a piston-cylinder unit 4, whose piston 5 is axially displaceable in a cylinder 8 by an electric motor 6 via a lead screw 7 or another rotation-to-translation conversion gear, in order to generate brake pressure. Piston-cylinder unit 4 may also be referred to as a plunger unit, and piston 5 may be referred to as a plunger piston. Cylinder 8 of piston-cylinder unit 4 of externally-powered brake pressure generator 3 is connected to an unpressurized brake fluid reservoir 10.

Wheel brakes 2 are connected to externally-powered brake pressure generator 3, strictly speaking, to cylinder 8 of piston-cylinder unit 4 of externally-powered brake pressure generator 3, via valves referred to here as power brake valves 11, first separating valves 12, and intake valves 14. For distribution to the two brake circuits I, II, two power brake valves 11 are positioned hydraulically in parallel, two first separating valves 12 are positioned hydraulically in parallel, as well, and in each instance, a power brake valve 11 and a first separating valve 12 are positioned hydraulically in series.

Wheel brakes 2 are connected to first separating valves 12 via intake valves 14; and namely, in each brake circuit I, II, two wheel brakes 2 are connected jointly to a first separating valve 12 by one intake valve 14, each. Wheel brakes 2 are connected to induction sides of hydraulic pumps 16 via discharge valves 15; the hydraulic pumps being able to be driven by a common electric motor 17. For each brake circuit I, II, a hydraulic pump 16 is present, to whose induction side the wheel brakes 2 of the respective brake circuit I, II are connected via discharge valves 15.

Between discharge valves 15 and hydraulic pumps 16, hydraulic reservoirs 18 are connected to the induction sides of hydraulic pumps 16 to temporarily store brake fluid, which flows out of wheel brakes 2 in response to the opening of discharge valves 15 while brake pressure is regulated and/or slip is controlled.

Intake valves 14 and discharge valves 15 form brake-pressure regulating valve set-ups, by which wheel brake pressures in each wheel brake 2 may be regulated individually. Traction control, in particular, antilock control, control of drive slip, and/or vehicle dynamics control, are possible together with hydraulic pumps 16. Common abbreviations for these traction control systems include TCS, ABS and/or ESP. Vehicle dynamics control systems are also referred to colloquially as skid protection systems. Such traction control systems are conventional and are not explained here.

In addition, the induction sides of hydraulic pumps 16 are connected to brake fluid reservoir 10 via, in each instance, a check valve 19 and an aspirator valve 20, which means that hydraulic pumps 16 may draw in brake fluid from brake fluid reservoir 10 to generate brake pressure or increase brake pressure. Check valves 19 may allow flow through them from the direction of brake fluid reservoir 10 in the direction of aspirator valves 20 and hydraulic pumps 16.

Vehicle brake system 1 includes a dual-circuit master brake cylinder 22, which may be actuated by muscle power via a brake pedal 21, and to which the wheel brakes 2 in each brake circuit I, II are connected, in each instance, via a second separating valve 23, first separating valves 12, and intake valves 14, so that vehicle brake system 1 may also be operated by muscle power. Second separating valves 23, first separating valves 12, and intake valves 14 are positioned hydraulically in series.

In principle, vehicle brake system 1 is intended to be actuated by external force; a brake pressure being generated by the externally-powered electrohydraulic brake pressure generator 3. In the event of a malfunction or a failure of externally-powered electrohydraulic brake pressure generator 3, it is possible to generate brake pressure, using hydraulic pumps 16 of the traction control system or, optionally, using master brake cylinder 22. Master brake cylinder 22 is used, as such, as a setpoint adjuster for the wheel brake pressures to be set in wheel brakes 2, when externally-powered electrohydraulic brake pressure generator 3 is functional.

In one of the two brake circuits I, a pedal-travel simulator 24 is connected to master brake cylinder 22 via a simulator valve 25. Pedal-travel simulator 24 is a spring-loaded hydraulic reservoir, into which brake fluid may be displaced from master brake cylinder 22 in the case of an open simulator valve 25, so that in the event of externally-powered braking, in which second separating valves 23 are closed, a piston in master brake cylinder 22 is displaceable and brake pedal 21 is movable, in order to convey a familiar pedal sensation to the driver.

Cylinder 8 of externally-powered brake pressure generator 3 is connected to brake fluid reservoir 10 via a discharge valve 9 and via a groove running around master brake cylinder 22. By opening discharge valve 9, excessive pressure in power brake system 1 may be reduced and brake fluid may be discharged into unpressurized brake fluid reservoir 10. The excessive pressure may be caused by temperature fluctuations, or, during the control of slip, hydraulic pumps 16 of the traction control system may have drawn in brake fluid from brake fluid reservoir 10 through check valves 19 and the aspirator valves 20 to be opened in this case; the brake fluid being able to be discharged into brake fluid reservoir 10 again, by opening power brake valves 11 and discharge valve 9.

In the specific embodiment of the power brake system 1 described and shown, first separating valves 12, intake valves 14, and second separating valves 23 are 2/2-way solenoid valves open in their de-energized initial states, and discharge valve 9, power brake valves 11, discharge valves 15, aspirator valves 20, and simulator valve 25 are 2/2-way solenoid valves closed in their de-energized initial states. Externally-powered brake pressure generator 3, master brake cylinder 22, pedal-travel simulator 24, simulator valve 25, check valves 19, power brake valves 11, and second separating valves 23 are combined to form a first module, which is referred to here as a pressure-generating module 26; and the electric motor 17 having hydraulic pumps 16, first separating valves 12, aspirator valves 20, intake valves 14, and discharge valves 15 are combined to form a second module, which is referred to here as a pressure-regulating module 27. In each brake circuit I, II, pressure-regulating module 27 is connected to pressure-generating module 26 by a brake line 28, and wheel brakes 2 are connected to pressure-regulating module 27 by brake lines. Variants of power brake system 1, in which all of the hydraulic components are accommodated in one module (not shown), are also possible.

Figure 2:
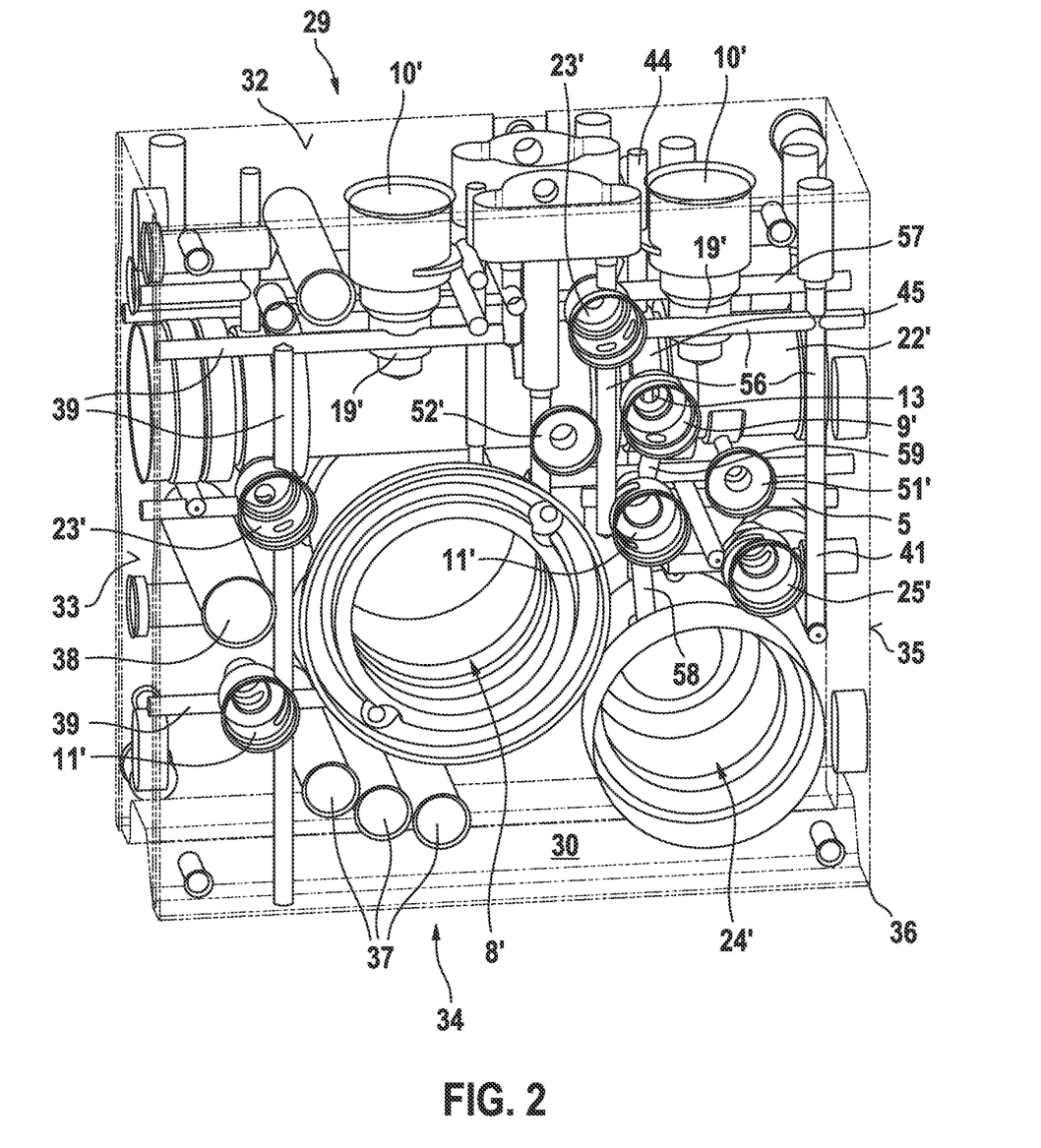
FIG. 2 shows a perspective view of a hydraulic block of the present invention for a hydraulic unit of the power brake system from FIG. 1, with a view of a valve side of the hydraulic block, according to an example embodiment of the present invention.
Figure 3:
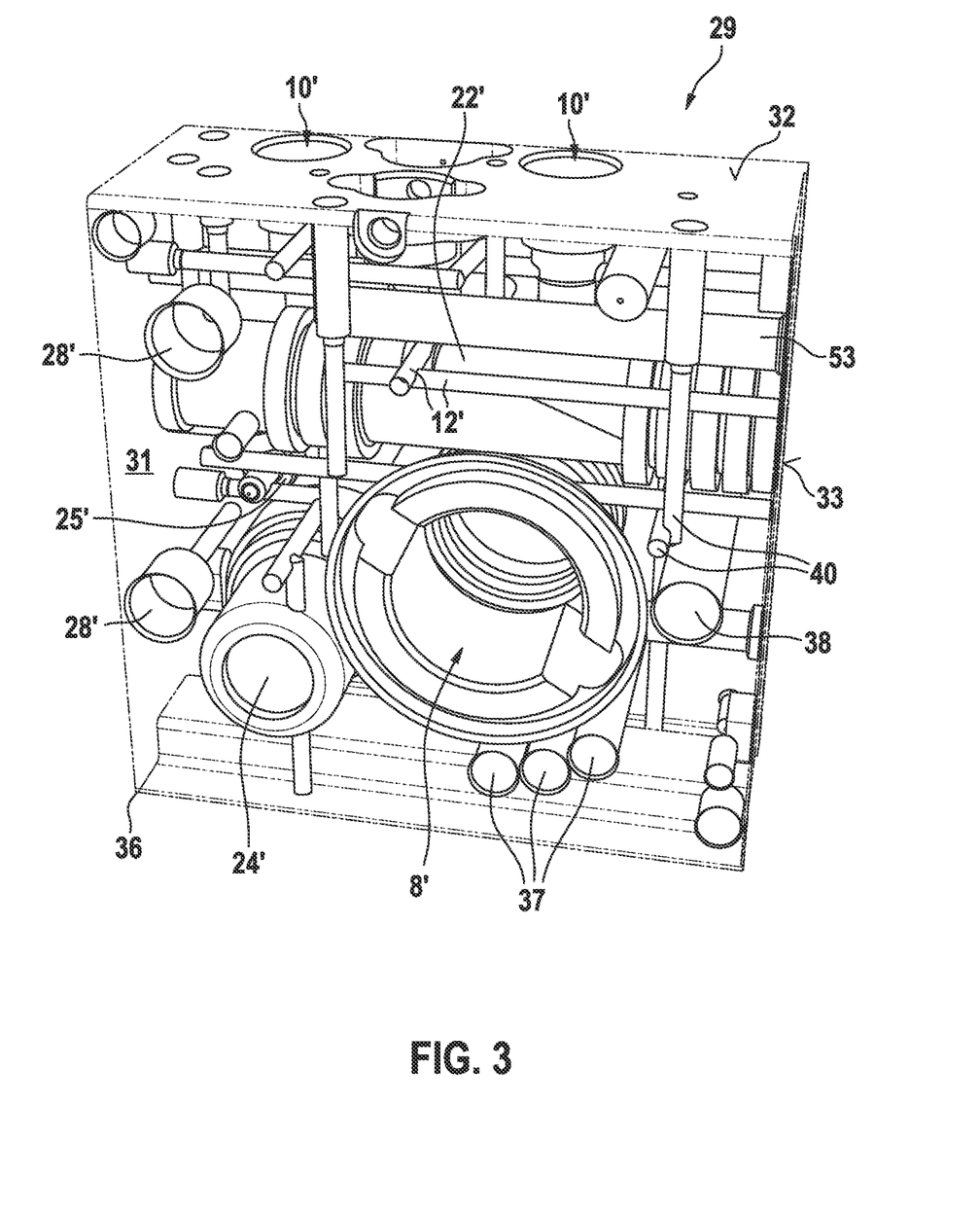
FIG. 3 shows the hydraulic block from FIG. 2, with a view of an opposing motor side of the hydraulic block.
Figure 4:
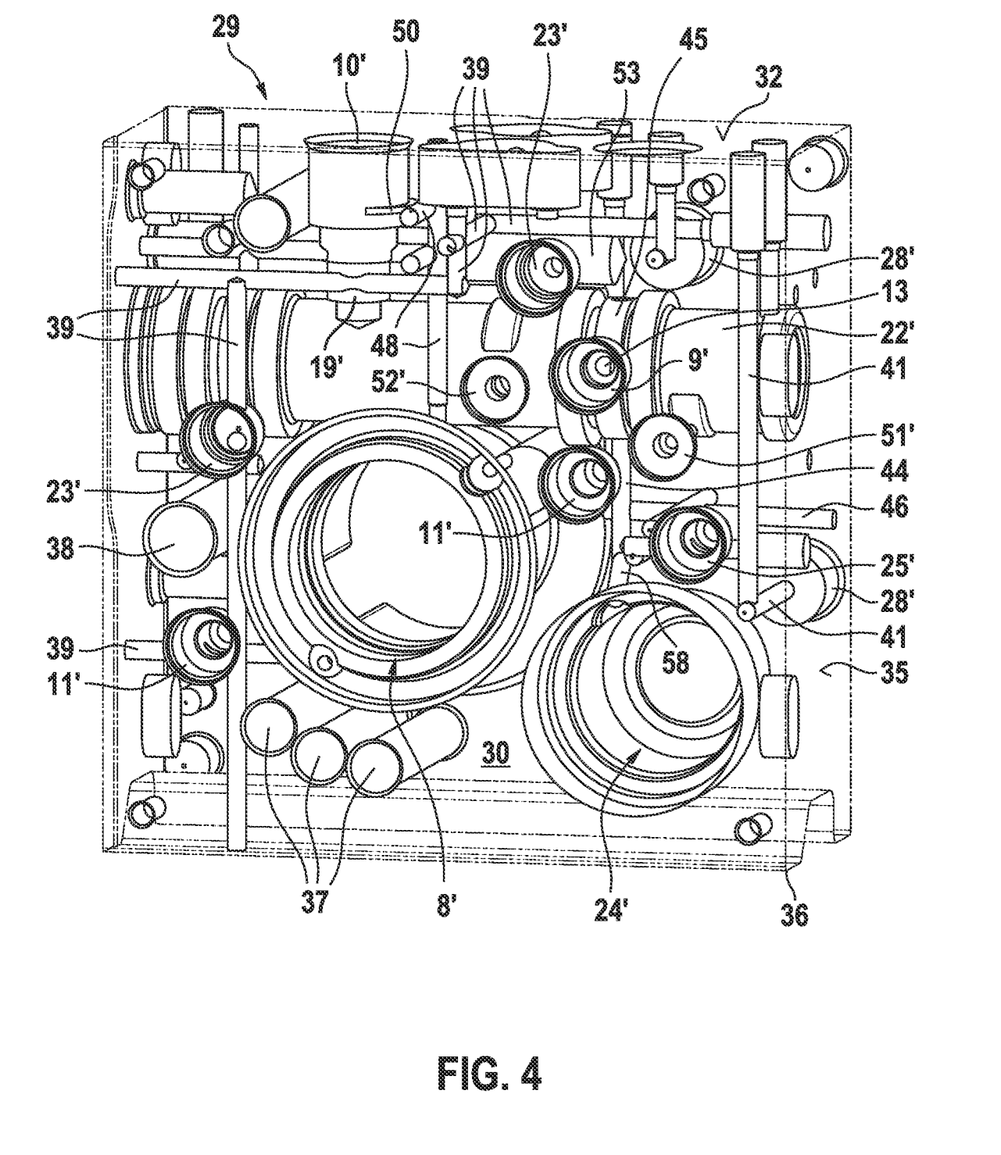
FIGS. 4 through 7 show the drilling of the hydraulic block from FIGS. 2 and 3, in accordance with an example embodiment of the present invention.

In the exemplary embodiment of the present invention, pressure-generating module 26 includes a hydraulic block 29, which is shown in FIGS. 2 through 4, and to and in which the hydraulic components of pressure-generating module 26 are positioned, attached, and interconnected hydraulically. Fitted with the hydraulic components, hydraulic block 29 forms a hydraulic unit of pressure-generating module 26 of power brake system 1. In the exemplary embodiment, hydraulic block 29 is a flat metal block having the shape of a right parallelpiped. "Flat" means that hydraulic block 29 is approximately 3 to 4 times as wide or long as it is thick. In the exemplary embodiment, two large, opposite sides of hydraulic block 29 are nearly square and form a valve side 30 (FIG. 2) and a motor side 31 (FIG. 3). The four additional sides of hydraulic block 29 are referred to below as upper side 32, attachment side 33, lower side 34, and opposite side 35 (the side opposite to attachment side 33). In the drawing, hydraulic block 29 is drawn bare, that is, without the hydraulic components.

Brake fluid reservoir 10 (not shown in FIGS. 2 through 4) is positioned on upper side 32 of hydraulic block 29. In upper side 32, hydraulic block 29 includes two depressions in the form of connections 10' for brake fluid reservoir 10; connection nipples projecting from a base of brake fluid reservoir 10 being inserted into the depressions, when brake fluid reservoir 10 is positioned on upper side 32 of hydraulic block 29. The connection nipples of brake fluid reservoir 10 are sealed in connections 10' by O-rings, or even in another manner. In the exemplary embodiment, the two connections 10' are situated in an imaginary plane parallel to valve side 30, namely, between valve side 30 and a center of hydraulic block 29, between valve side 30 and motor side 31.

Upper side 32 is located at the top in an intended installation position and position of normal use of hydraulic block 29. Attachment side 33 borders on upper side 32. Using it, hydraulic block 29 is secured to a bulkhead of a motor vehicle not shown. A master brake cylinder bore 22' forming master brake cylinder 22 opens out on attachment side 33 and runs through hydraulic block 29, halfway between valve side 30 and motor side 31, in parallel with upper side 32 and the lower side 34 opposite to upper side 32. Master brake cylinder bore 22' is closed on a side opposite to its mouth on attachment side 33. Master brake cylinder bore 22' is situated a little above halfway between upper side 32 and lower side 34 of hydraulic block 29.

A power brake cylinder bore 8', which forms cylinder 8 of externally-powered brake pressure generator 3, is introduced into hydraulic block 29, perpendicularly to master brake cylinder bore 22', straight through from valve side 30 to motor side 31. On valve side 30, power brake cylinder bore 8' is extended and sealed by a dome, which is not shown, has the shape of a cylindrical tube, and is closed at a front end. Power brake cylinder bore 8' is situated between master brake cylinder bore 22' and lower side 34 of hydraulic block 29 and passes master brake cylinder bore 22' perpendicularly in close proximity. It is positioned so as to be somewhat offset from the center in the direction of attachment side 33 of hydraulic block 29.

Electric motor 6 of externally-powered brake pressure generator 3, which is not depicted in FIGS. 2 through 4, is positioned externally on motor side 31 of hydraulic block 29, coaxially to power brake cylinder bore 8'. A planetary gear in the form of a reduction gear, and lead screw 7, which is a ball screw in the exemplary embodiment, are positioned coaxially to power brake cylinder bore 8', between electric motor 6 and piston 5 of externally-powered brake pressure generator 3 (not depicted in FIGS. 2 through 4).

A simulator cylinder bore 24' of pedal-travel simulator 24 is introduced in valve side 30 of hydraulic block 29, parallelly to power brake cylinder bore 22' and perpendicularly to master brake cylinder bore 22'. In the exemplary embodiment, simulator cylinder bore 24' is introduced between power brake cylinder bore 8' and an edge 36 of hydraulic block 29, at the transition from opposite side 35 to lower side 34. Simulator cylinder bore 24' is closed on motor side 31.

Receptacles 9', 11', 12', 20', 23', 25' for solenoid valves 9, 11, 12, 15, 20, 23, 25, and receptacles 51', 52' for further components, such as pressure sensors 51, 52, are introduced in valve side 30 of hydraulic block 29. Receptacles 12', 13', 16', 19', 21', 51', 52', which are denoted in FIGS. 2 through 7 by the reference numeral of the specific solenoid valve 9, 11, 12, 15, 20, 23, 25 or of other component 51, 52, supplemented with an apostrophe, are cylindrical depressions or blind-end bores in hydraulic block 29, partially stepped in diameter. The hydraulic components are inserted into the receptacles and are caulked circumferentially in a pressure-tight manner. Hydraulic portions of solenoid valves 9, 11, 12, 15, 20, 23, 25, which form the actual valves, are situated in the receptacles. The armatures and magnetic coils, which are accommodated in a valve dome, project perpendicularly from valve side 30 of hydraulic block 29.

Three motor current bores 37 passing through from valve side 39 to motor side 31 are introduced in hydraulic block 29, on an imaginary circular arc about power brake cylinder bore 8'. One of the three motor current bores 37 is situated underneath power brake cylinder bore 8', that is, between power brake cylinder bore 8' and lower side 34 of hydraulic block 29. The two other motor current bores 37 follow on the imaginary circular arc about power brake cylinder bore 8', in the direction of attachment side 33 of hydraulic block 29. Motor current bores 37 are used for feeding through electrical cables to power the electric motor 6 of externally-powered brake pressure generator 3.

In addition, hydraulic block 29 includes a signal line bore 38, which passes through from valve side 30 to motor side 31, as well. Signal line bore 38 is situated between power brake cylinder bore 8' and attachment side 33 of hydraulic block 29. Signal lines for the control or regulation of electric motor 6 of externally-powered brake pressure generator 3 by an electronic control unit not shown, which is attached to valve side 30 of hydraulic block 29, are fed through the signal line bore to the electric motor 6 on motor side 31 of hydraulic block 29.

Hydraulic block 29 of the hydraulic unit of power brake system 1 is drilled in accordance with the hydraulic circuit diagram shown in FIG. 1. The cylinder bores introduced in hydraulic block 29, receptacles for the solenoid valves and connections, as well as the bores, which connect them according to the hydraulic circuit diagram and form brake fluid lines, are meant by "drilled" and/or "drilling." Hydraulic block 29 is drilled in a cartesian manner, that is, the bores, receptacles, connections, lines, etc. are introduced in hydraulic block 29 parallelly and perpendicularly to each other and to sides and edges of hydraulic block 29. This does not exclude individual lines and bores running diagonally.

A receptacle 9' for discharge valve 9 and a receptacle 11' for one of the two power brake valves 11 are introduced perpendicularly, one on top of the other, in valve side 30 of hydraulic block 29, so as to be offset from power brake cylinder bore 8' somewhat in the direction of opposite side 35. To connect discharge valve 9 to brake fluid reservoir 10, a brake fluid line 58 runs coaxially from a base of the receptacle 9' for discharge valve 9 into a groove 45, which encircles master brake cylinder bore 22'; brake fluid line 58 leading radially into groove 45 (FIG. 4). A fifth brake fluid line 44, which communicates with one of the connections 10' for brake fluid reservoir 10, runs from upper side 32 of hydraulic block 29 to the groove 45 surrounding master brake cylinder bore 22', as well, which means that receptacle 9' for discharge valve 9 is joined to connection 10' for brake fluid reservoir 10. Using groove 45, receptacle 9' for discharge valve 9 also communicates with connection 10' for brake fluid reservoir 10, when an unshown master brake cylinder piston in master brake cylinder bore 22 is situated within groove 45.

Fifth brake fluid line 44 passes through master brake cylinder bore 22' radially at groove 45 and continues in the direction of simulator cylinder bore 24', into which it opens out, using an oblique bore 58.

An oblique bore 59, which is introduced in hydraulic block 29 at an angle of 45° to valve side 30, runs from receptacle 9' for discharge valve 9 to a brake fluid line, which opens out into a base of the receptacle 11' for the one power brake valve 11 (FIG. 2). A bore runs from receptacle 11' for power brake valve 11 to groove 45, which surrounds master brake cylinder bore 22', and from which fifth brake fluid line 44 leads upwards to upper side 32 of hydraulic block 29. A bore perpendicular to valve side 30 joins fifth brake fluid line 44 to one of the two connections 10' for brake fluid reservoir 10.

In motor side 31 (FIG. 3), hydraulic block 29 includes two blind-end bores as connections 28' for the brake lines 28, which lead to pressure-regulating module 27 and may be joined to connections 28', using press-in nipples or screw ferrules, or in a different manner. In motor side 31 of hydraulic block 29, a first of the two connections 28' is situated between simulator cylinder bore 24' and opposite side 35 of hydraulic block 29, and a second of the two connections 28' is situated near the closed end of master brake cylinder bore 22', offset somewhat upwards in the direction of upper side 32 with respect to master brake cylinder bore 22'.

A receptacle 23' for a second separating valve 23 is introduced approximately tangentially to master brake cylinder bore 22', between power brake cylinder bore 8' and attachment side 33, in valve side 30 of hydraulic block 29. A receptacle 11' for a power brake valve 11 is introduced under it, in valve side 30 of hydraulic block 29, shifted in the direction of lower side 24.

At a base of the connections 10' for brake fluid reservoir 10, receptacles 19' for check valves 19 are introduced in hydraulic block 29, coaxially to connections 10'. Receptacles 19' are constructed as extensions of the connections 10' taking the form of blind-end bores stepped in diameter.

In order to join power brake cylinder bore 8' to one of the two connections 28' for the brake lines 28 running to pressure-regulating module 27, via one of the two power brake valves 11, hydraulic block 29 includes a first brake fluid line 39, which is bent several times and is made up of a plurality of bores opening out into each other (FIG. 4). A bore, which, as a part of first brake fluid line 39, intersects one of the two receptacles 11' for power brake valves 11, runs from opposite side 35 of hydraulic block 29, approximately tangentially into power brake cylinder bore 8'. A bore, which comes from lower side 34 of hydraulic block 29 and is a part of first brake fluid line 39, as well, runs upwards from receptacle 11' for power brake valve 11 in the direction of upper side 32 of hydraulic block 29. The bore coming from lower side 34 runs through between the valve side and master brake cylinder bore 22', connects receptacle 11' for power brake valve 11 to one of the two receptacles 23' for one of the two second separating valves 23, and ends somewhat above master brake cylinder bore 22', where it empties out into a bore, which comes from attachment side 33 and runs approximately halfway between attachment side 33 and the side 35 opposite to attachment side 33. There, a bore running perpendicularly to valve side 30 connects the bore coming from attachment side 33 to a bore, which comes from opposite side 35 and communicates with the one of the two connections 28' for pressure-regulating module 27.

In order to join power brake cylinder bore 8' to another of the two connections 28' for the brake lines 28 running to pressure-regulating module 27, via another of the two power brake valves 11, hydraulic block 29 includes a sixth brake fluid line 46, which is bent several times and is made up of a plurality of bores opening out into each other (FIG. 4). Sixth brake fluid line 46 runs initially parallelly to power brake cylinder bore 8', outside of a circumference of power brake cylinder bore 8', in the direction of motor side 31 of hydraulic block 29, where, just before halfway between valve side 30 and motor side 31, it enters a bore, which runs to the side 35 of hydraulic block 29 opposite to attachment side 33, and where it enters a bore, which leads upwards to upper side 32 of hydraulic block 29. The two bores are parts of sixth brake fluid line 46 and are therefore denoted by reference numeral 46. A bore runs coaxially from the bore leading to opposite side 35, into the receptacle 11' for other power brake valve 11.

The bore leading to upper side 32 runs to receptacle 9' for discharge valve 9, from which a bore runs to opposite side 35. From this bore, a bore coming from upper side 32 runs downwards, in parallel with and near opposite side 35, in the direction of lower side 34 of hydraulic block 29. The bore leading downwards runs through between receptacle 25' for simulator valve 25 and opposite side 35 to somewhat below receptacle 25' for simulator valve 25 and ends diagonally above simulator cylinder bore 24'. From there, a bore, which is part of sixth brake fluid line 46, just as the above-described bores, leads axially into connection 28' for pressure-regulating module 27 in such a manner, that power brake cylinder bore 8' is joined to connection 28' by the repeatedly bent, sixth brake fluid line 46, via receptacle 11' for power brake valve 11.

In order to join master brake cylinder bore 22' to the other of the two connections 28' for pressure-regulating module 27, via another of the two second power brake valves 23, hydraulic block 29 includes a seventh brake fluid line 47, which runs from the side 35 opposite to attachment side 33 to the receptacle 23' for the other of the two second power brake valves 23 (FIG. 4).

Above-described, sixth brake fluid line 46 runs from receptacle 23' for other second power brake valve 23 to connection 28' for pressure-regulating module 27. Segments of sixth and seventh brake fluid lines 46, 47 parallel to master brake cylinder bore 22' are situated in a common plane parallel to upper side 32 of hydraulic block 29, somewhat above master brake cylinder bore 22'; sixth brake fluid line 46 and seventh brake fluid line 47 being situated closer to valve side 30 and to motor side 31 of hydraulic block 29, respectively. A bore, which comes from upper side 32 and is part of seventh brake fluid line 47, connects the seventh brake fluid line to master brake cylinder bore 22'. This bore opens out near a closed end and from above, into master brake cylinder bore 22' in such a manner, that master brake cylinder bore 22', that is, master brake cylinder 22, may be exhausted.

A receptacle 23' for a second separating valve 23 is introduced in valve side 30 of hydraulic block 29, approximately tangentially to master brake cylinder bore 22', above master brake cylinder bore 22'.

A ninth brake fluid line 55 coming from opposite side 35 connects receptacle 23' for second separating valve 23 to power brake cylinder bore 8' (FIG. 2).

A tenth, repeatedly angled brake fluid line 56 runs upwards from receptacle 23' for second separating valve 23 to receptacle 23' for one of the two separating valves 23 and leads, from there, further in the direction of opposite side 35 of hydraulic block 29 and, after a bend, downwards, in parallel with opposite side 35, to one of the two connections 28' for pressure-regulating valve 27, into which tenth brake fluid line 56 opens out after a bend in the direction of valve side 30 of hydraulic block 29 (FIG. 2).

Figure 5:
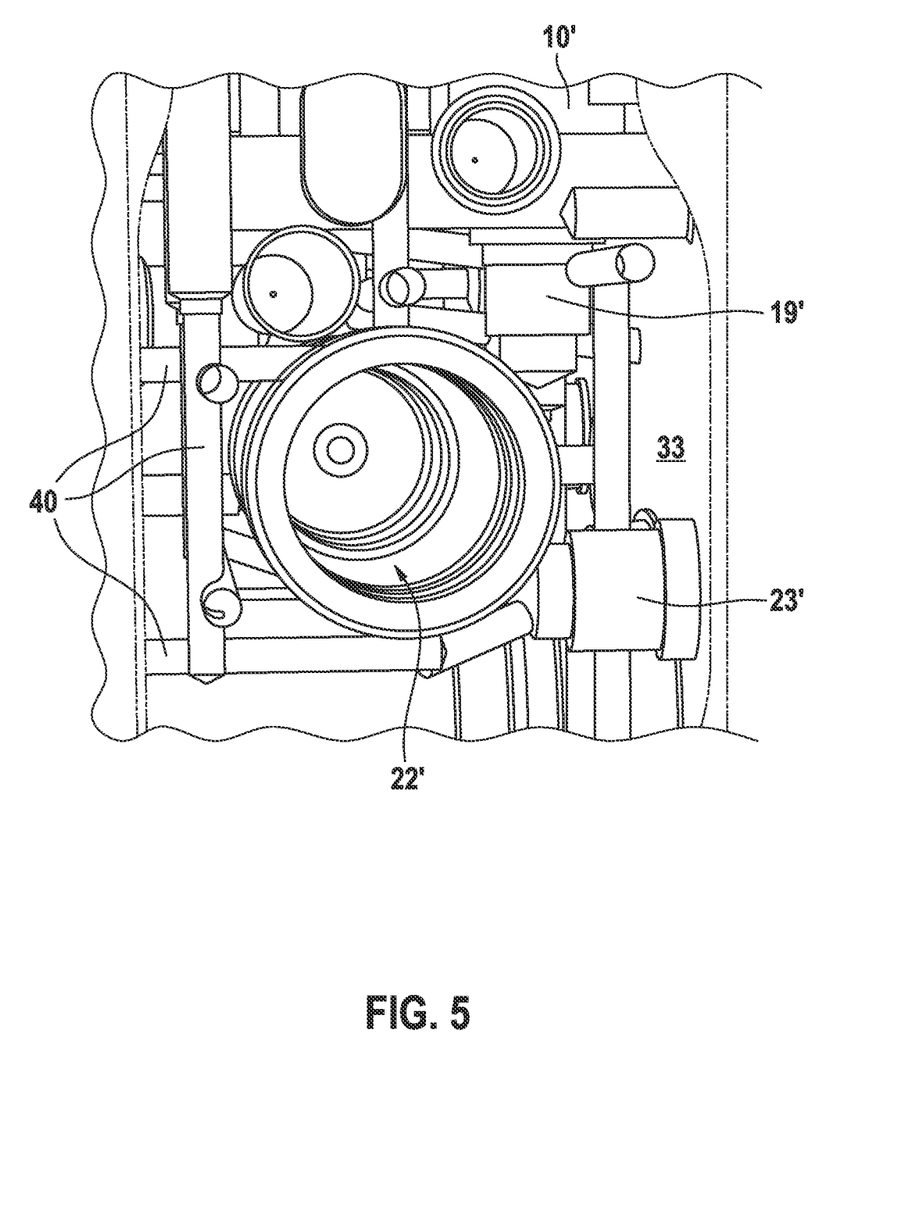

As the cutaway portion of hydraulic block 29, having a view of the mouth of master brake cylinder bore 22' on attachment side 33 of hydraulic block 29, shows in FIG. 5, a repeatedly bent, second brake fluid line 40 runs on motor side 31 and below master brake cylinder bore 22', through to one of the two receptacles 23' for one of the two second separating valves 23, in valve side 30 of hydraulic block 29. Coming from motor side 31, at a circumferential location facing upper side 32 of hydraulic block 29, second brake fluid line 40 opens out tangentially into master brake cylinder bore 22'. This allows master brake cylinder bore 22' to be exhausted, when hydraulic block 29 is attached, as intended, to a bulkhead of a motor vehicle with its upper side 32 up. There is also the possibility to exhaust, if hydraulic block 29 is attached slantedly to an inclined bulkhead of the motor vehicle at an inclination of upper side 32 of, for example, 2° or even more.

Receptacle 23' for second separating valve 23 is joined to connection 28' for pressure-regulating module 27 by first brake fluid line 39.

Figure 6:
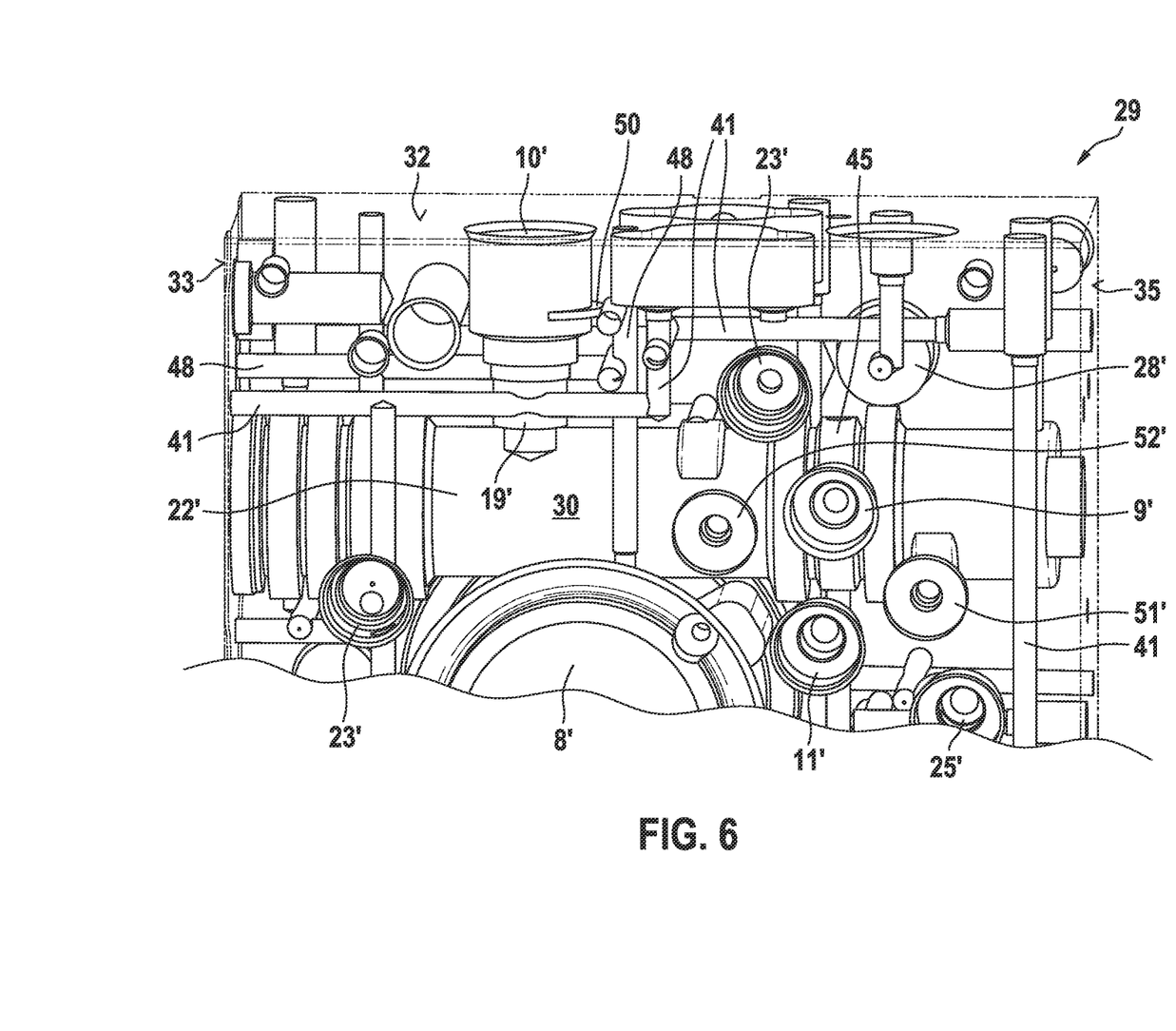

In order to join brake fluid reservoir 10 to one of the two connections 28' for pressure-regulating module 27, hydraulic block 29 has a third brake fluid line 41, which, as can be seen in FIG. 6, runs from receptacle 19' for check valve 19, at the base of one of the two connections 10' for brake fluid reservoir 10 in upper side of hydraulic block 29, a short stretch to approximately the middle of hydraulic block 29, between attachment side 33 and opposite side 35, and there, further perpendicularly to valve side 30 in the direction of motor side 31, and from there, further to opposite side 35. Third brake fluid line 41 intersects connection 28', through which it joins the one connection 10' for brake fluid reservoir 10 to connection 28' for pressure-regulating module 27, via receptacle 19' for check valve 19.

Figure 7:
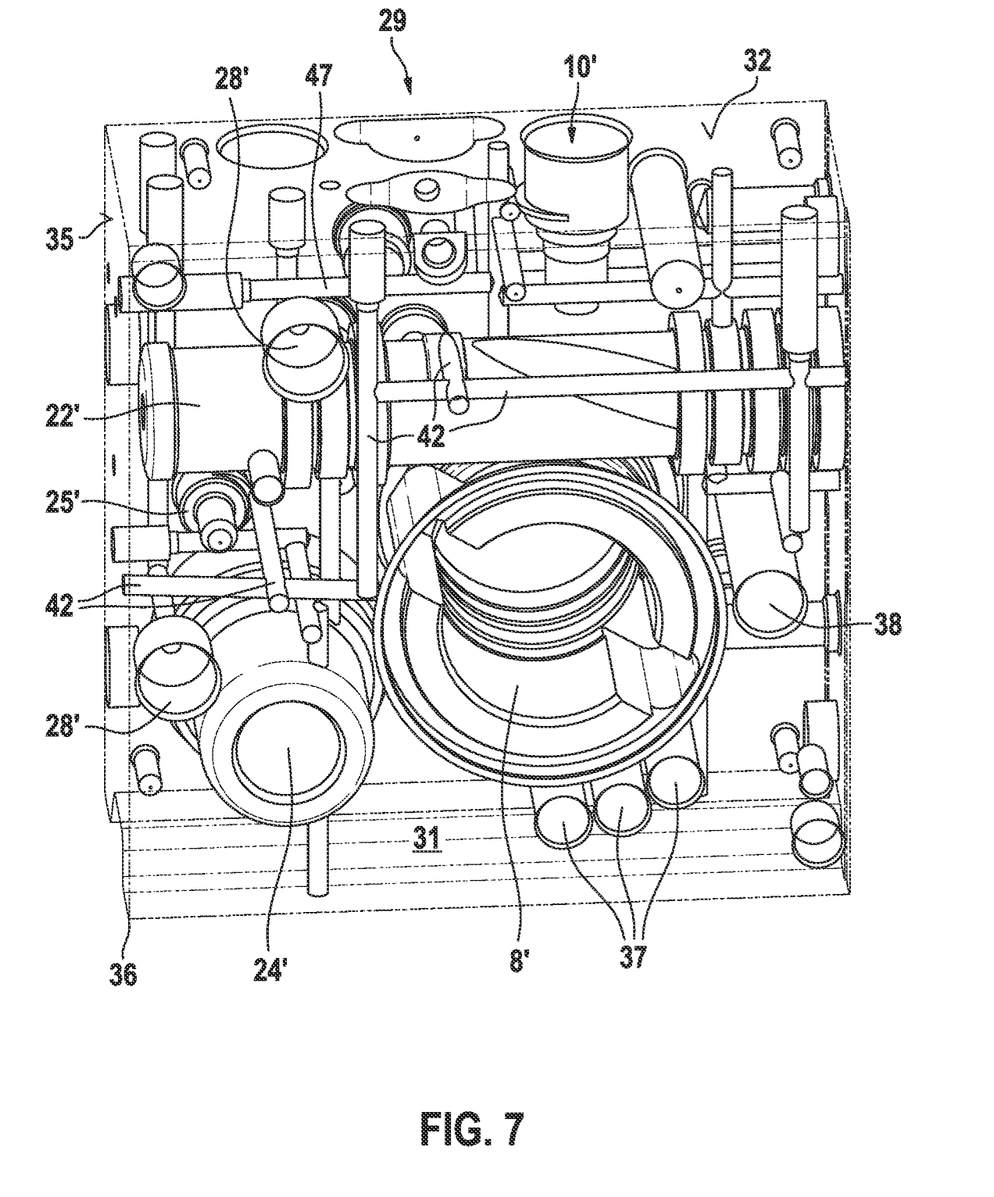

From the second brake fluid line 40, which encircles master brake cylinder bore 22' with a plurality of bends and connects master brake cylinder bore 22' to receptacle 23' for second separating valve 23, a fourth brake fluid line 42 coming from attachment side 33 runs parallelly to master brake cylinder bore 22' up to a bore, which comes from upper side 32 and ends at a medium elevation of power brake cylinder bore 8' on a side of power brake cylinder bore 8' facing opposite side 35 (FIG. 7). From there, fourth brake fluid line 42 runs further in the direction of the opposite side and, after a further bend, perpendicularly in the direction of valve side 30. Fourth brake fluid line 42 opens out into a groove 43 close to a base of receptacle 25' for simulator valve 25. Groove 43 is open in the direction of receptacle 25'. A segment of fourth brake fluid line 42 parallel to master brake cylinder bore 22' runs at the level of an imaginary tangential plane at a circumferential point of master brake cylinder bore 22' facing upper side 32 of hydraulic block 29.

As is apparent in FIG. 4, an eighth brake fluid line 48 runs upwards from a groove 49 encircling power brake cylinder bore 8', in the direction of upper side 32 of hydraulic block 29; after a bend, the eighth brake fluid line running further in the direction of valve side 30. Eighth brake fluid line 48 intersects a recess 50 in one of the two connections 10' for brake fluid reservoir 10 in upper side 32 of hydraulic block 29. Eighth brake fluid line 48 joins power brake cylinder bore 8' to connection 10' for brake fluid reservoir 10.

An eleventh brake fluid line 57 coming from opposite side 35 runs parallelly to master brake cylinder bore 22' up to receptacle 23' for one of the two separating valves 23. After a bend downwards, eleventh brake fluid line 57 opens out into master brake cylinder bore 22' radially close to an end facing opposite side 35. Eleventh brake fluid line 57 connects master brake cylinder bore 22' to receptacle 23' for one of the two separating valves 23 (FIG. 2).

Reference numeral 51' denotes a receptacle for a pressure sensor 51 connected to master brake cylinder 22, and reference numeral 52' denotes a receptacle for a pressure sensor 52, in valve side 30 of hydraulic block 29; the latter pressure sensor being connected to cylinder 8 of externally-powered brake pressure generator 3.

A position of receptacles 9', 11', 12', 20', 23', 25' for solenoid valves 9, 11, 12, 15, 20, 23, 25, and of receptacles 51', 52' for the two pressure sensors 51, 52 in the hydraulic block 29 for the hydraulic unit of power brake system 1, and some of the drilling of hydraulic block 29, may be gathered from the drawing.

A bore 53 for a pedal-travel sensor 54 runs from attachment side 33, parallelly to master brake cylinder bore 22', into hydraulic block 29. An unshown, rod-shaped magnetic support having a permanent magnet at its end is inserted into bore 53; the magnetic support being rigidly connected to a master brake cylinder piston outside of hydraulic block 29 in such a manner, that the permanent magnet moves along with the master brake cylinder piston in bore 53. Using the permanent magnet, a movement and/or a position of the master brake cylinder piston may be determined by pedal-travel sensor 54.

The brake fluid lines are numbered consecutively, in order to distinguish them. Not all of the brake fluid lines described have to be present.

What is claimed is:

1. A right-parallelpiped-shaped hydraulic block for a hydraulic unit of a hydraulic power brake system, comprising:
    an upper side;
    a lower side opposite to the upper side;
    an attachment side bordering on the upper side;
    a motor side bordering on the upper side, the lower side, and the attachment side; and
    a valve side opposite to the motor side;
    wherein the hydraulic block includes:
        a master brake cylinder bore which opens out on the attachment side;
        a power brake cylinder bore which opens out on the motor side;
        a receptacle for a discharge valve, which connects the master brake cylinder bore to the power brake cylinder bore, in the valve side,
        a brake fluid line running from a base of the receptacle into a groove encircling the master brake cylinder bore,
        a receptacle for a power brake valve, which joins the power brake cylinder bore to connections for a pressure-regulating module of the power brake system, in the valve side, and
        an oblique bore which connects the receptacle for the discharge valve to the receptacle for the power brake valve.

2. The hydraulic block as recited in claim 1, wherein the hydraulic block includes:
    a connection for a brake fluid reservoir in the upper side;
    a receptacle for a check valve in an extension of the connection for the brake fluid reservoir;
    a first brake fluid line which runs from the receptacle for the check valve, parallelly to the master brake cylinder bore and, after a bend, in a direction of the lower side of the hydraulic block, to: (i) a receptacle for a second separating valve, which is situated in the valve side of the hydraulic block, and/or (ii) a receptacle for the power brake valve which is situated in the valve side of the hydraulic block.

3. The hydraulic block as recited in claim 2, wherein after the bend in the direction of the lower side of the hydraulic block, the first brake fluid line runs through perpendicularly to the master brake cylinder bore, between the valve side of the hydraulic block and the master brake cylinder bore, in the direction of the lower side of the hydraulic block.

4. The hydraulic block as recited in claim 2, wherein the hydraulic block includes two connections for the brake fluid reservoir, which are situated in the upper side of the hydraulic block, in a plane parallel to the valve side.

5. The hydraulic block as recited in claim 1, wherein the hydraulic block includes connections for brake lines leading to the pressure-regulating module, in the motor side of the hydraulic block, near a side opposite to the attachment side.

6. The hydraulic block as recited in claim 5, wherein a first brake fluid line bent several times runs from the power brake cylinder bore in a direction of the attachment side, to one of the connections for the pressure-regulating module, and from there, further upwards past the master brake cylinder bore, where it runs parallelly to the master brake cylinder bore to approximately halfway between the attachment side and the opposite side, where, after a shift perpendicular to the valve side, it runs further in the direction of the opposite side, up to the connection for the pressure-regulating module.

7. The hydraulic block as recited in claim 5, wherein a sixth brake fluid line bent several times runs upwards from the power brake cylinder bore to the receptacle for the power brake valve, and from there, further in the direction of the opposite side, and then downwards in parallel with the opposite side, up to one of the connections for the pressure-regulating module.

8. The hydraulic block as recited in claim 2, wherein a seventh brake fluid line, which, coming from a side opposite to the attachment side, runs parallelly to the master brake cylinder bore, to the receptacle for the second separating valve, connects the master brake cylinder bore to the receptacle for the second separating valve.

9. The hydraulic block as recited in claim 2, wherein the hydraulic block includes a simulator cylinder bore and a fifth brake fluid line, which communicates with a connection for the brake fluid reservoir in the upper side of the hydraulic block, and which runs radially through the groove encircling the master brake cylinder bore, to the simulator cylinder bore.

10. The hydraulic block as recited in claim 9, wherein the hydraulic block includes a receptacle for a second separating valve, in the valve side, which communicates with the master brake cylinder bore; and a brake fluid line runs from the receptacle for the second separating valve, parallelly to the master brake cylinder bore, to a side of the hydraulic block opposite to the attachment side and, after a bend downwards, parallelly to the side opposite to the attachment side, in the direction of the lower side and, after a further bend, to one of the connections for the pressure-regulating module, in the motor side of the hydraulic block.

11. The hydraulic block as recited in claim 1, wherein a second brake fluid line bent several times runs through on the motor side and below the master brake cylinder bore, around the master brake cylinder bore, to a receptacle for a second separating valve.

12. The hydraulic block as recited in claim 1, wherein a sixth brake fluid line, which communicates with the master brake cylinder bore, runs from a side of the hydraulic block opposite to the attachment side, to a receptacle for a separating valve.

13. The hydraulic block as recited in claim 2, wherein an eighth brake fluid line, which runs from the power brake cylinder bore in a direction of the upper side of the hydraulic block and, after a bend in a direction of the valve side, intersects a recess in the connection for the brake fluid reservoir, joins the power brake cylinder bore to the connection for the brake fluid reservoir.

14. The hydraulic block as recited in claim 1, wherein the hydraulic block includes a bore in the attachment side for a pedal-travel sensor, the bore being parallel to the master brake cylinder bore.

* * * * *